(12) United States Patent  (10) Patent No.: US 7,965,495 B2
Hendren et al.  (45) Date of Patent: Jun. 21, 2011

(54) BATTERY CONNECTOR STRUCTURES FOR ELECTRONIC DEVICES

(75) Inventors: Keith J. Hendren, Capitola, CA (US); Daniel J. Coster, San Francisco, CA (US); John Brock, San Francisco, CA (US); Michelle Rae Goldberg, Sunnyvale, CA (US); Dinesh Mathew, Fremont, CA (US); Chris Ligtenberg, San Carlos, CA (US); Hank D. Ching, Fremont, CA (US); Glenn E. Wheelock, San Jose, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 12/340,612

(22) Filed: Dec. 19, 2008

(65) Prior Publication Data

US 2010/0091451 A1  Apr. 15, 2010

Related U.S. Application Data

(60) Provisional application No. 61/105,030, filed on Oct. 13, 2008.

(51) Int. Cl.
*G06F 1/16*  (2006.01)
(52) U.S. Cl. ............... 361/679.01; 361/679.26; 429/96; 429/123
(58) Field of Classification Search ............. 361/679.01
See application file for complete search history.

(56) References Cited

U.S. PATENT DOCUMENTS

| | | | |
|---|---|---|---|
| 3,255,429 A * | 6/1966 | Forney, Jr. ............ | 439/411 |
| 3,568,139 A | 3/1971 | Delzer | |
| 4,224,383 A | 9/1980 | Taylor | |
| 4,270,827 A | 6/1981 | Potgieter | |
| 4,473,264 A | 9/1984 | Julian et al. | |
| 4,920,018 A | 4/1990 | Turner | |
| 4,950,842 A * | 8/1990 | Menninga ............ | 174/67 |
| 4,991,058 A | 2/1991 | Watkins et al. | |
| 5,010,642 A * | 4/1991 | Takahashi et al. ........ | 29/868 |
| 5,155,662 A | 10/1992 | I-Shou | |
| 5,169,338 A | 12/1992 | Dewar et al. | |
| 5,187,643 A | 2/1993 | I-Shou | |
| D335,647 S * | 5/1993 | Hood ................. | D13/119 |
| 5,323,291 A | 6/1994 | Boyle et al. | |
| 5,325,984 A | 7/1994 | Ady et al. | |
| 5,346,407 A | 9/1994 | Hood | |
| 5,455,383 A * | 10/1995 | Tanaka ................. | 174/36 |
| 5,552,958 A * | 9/1996 | Seto et al. ............. | 361/679.55 |
| 5,566,048 A | 10/1996 | Esterberg et al. | |
| 5,572,402 A | 11/1996 | Jeong | |
| 5,670,267 A | 9/1997 | Lee | |
| 5,695,158 A * | 12/1997 | Boucot ................ | 248/49 |
| 5,739,463 A * | 4/1998 | Diaz et al. ............. | 174/378 |

(Continued)

*Primary Examiner* — Jayprakash N Gandhi
*Assistant Examiner* — Anthony Q Edwards
(74) *Attorney, Agent, or Firm* — Treyz Law Group; G. Victor Treyz; David C. Kellogg

(57) ABSTRACT

A portable computer is provided that has a housing. A removable battery may provide power to the portable computer. A connector on the battery may mate with a corresponding battery connector in the portable computer housing. The battery connector may be mounted in the portable computer housing using a floating arrangement. This allows the position of the connector to move slightly to accommodate variations in the position of the battery. A cable may be used to route power between the battery and a main logic board. A cover may be used to hold the battery connector and cable to the housing of the portable computer without excessively impeding movement of the connector.

17 Claims, 5 Drawing Sheets

U.S. PATENT DOCUMENTS

| | | | |
|---|---|---|---|
| 5,739,470 A * | 4/1998 | Takeda | 174/97 |
| 5,786,106 A * | 7/1998 | Armani | 429/98 |
| 5,808,864 A | 9/1998 | Jung | |
| 5,841,630 A * | 11/1998 | Seto et al. | 361/679.58 |
| 5,867,371 A * | 2/1999 | Denzene et al. | 361/816 |
| 5,895,440 A | 4/1999 | Proctor et al. | |
| 5,897,392 A * | 4/1999 | Takahashi et al. | 439/470 |
| 5,965,842 A * | 10/1999 | Ganninger et al. | 174/377 |
| RE36,381 E | 11/1999 | Boyle et al. | |
| 6,012,683 A * | 1/2000 | Howell | 248/49 |
| 6,068,520 A | 5/2000 | Winings et al. | |
| 6,102,733 A * | 8/2000 | Anderson et al. | 439/535 |
| 6,140,576 A * | 10/2000 | Kanne et al. | 174/378 |
| 6,249,426 B1 | 6/2001 | O'Neal et al. | |
| 6,297,946 B2 | 10/2001 | O'Neal et al. | |
| 6,297,967 B1 * | 10/2001 | Davidson et al. | 361/800 |
| 6,304,060 B1 | 10/2001 | Dernehl | |
| 6,304,433 B2 | 10/2001 | O'Neal et al. | |
| 6,373,693 B1 * | 4/2002 | Seto et al. | 361/679.33 |
| 6,380,488 B1 * | 4/2002 | Takeda et al. | 174/135 |
| 6,413,120 B1 | 7/2002 | Winings | |
| 6,426,881 B1 * | 7/2002 | Kurz | 361/800 |
| 6,459,517 B1 * | 10/2002 | Duncan et al. | 398/135 |
| 6,477,035 B1 | 11/2002 | Cepas et al. | |
| 6,483,719 B1 | 11/2002 | Bachman | |
| 6,501,016 B1 * | 12/2002 | Sosnowski | 174/382 |
| 6,501,644 B1 | 12/2002 | Silverman et al. | |
| 6,617,973 B1 * | 9/2003 | Osterman | 340/636.1 |
| 6,636,016 B2 * | 10/2003 | Tanaka et al. | 320/107 |
| 6,660,427 B1 | 12/2003 | Hukill et al. | |
| 6,679,732 B2 | 1/2004 | Mikami et al. | 439/620.05 |
| 6,696,816 B2 | 2/2004 | Guo et al. | 320/110 |
| 6,747,870 B2 | 6/2004 | Toh | 361/690 |
| 6,751,484 B1 | 6/2004 | Sandelius et al. | |
| 6,781,827 B2 | 8/2004 | Goodman et al. | |
| 6,869,309 B2 | 3/2005 | Ziegler et al. | 439/504 |
| 6,875,056 B1 | 4/2005 | Bianchini et al. | 439/607.2 |
| 6,879,259 B1 | 4/2005 | Smith et al. | |
| 6,887,616 B2 | 5/2005 | Kim et al. | |
| 7,013,558 B2 | 3/2006 | Bachman | |
| D520,015 S | 5/2006 | Peddle | D14/435 |
| 7,040,491 B1 | 5/2006 | Claprood et al. | 211/26 |
| 7,050,293 B2 | 5/2006 | Arbisi et al. | 361/679.3 |
| 7,109,420 B2 | 9/2006 | Arai et al. | 174/72 A |
| 7,259,969 B2 | 8/2007 | Zarganis et al. | 361/800 |
| 7,379,296 B1 | 5/2008 | Huang | 361/679.41 |
| 7,388,161 B2 | 6/2008 | Hsieh et al. | 174/382 |
| 7,414,197 B2 | 8/2008 | Ortiz et al. | 174/74 R |
| 7,457,135 B2 | 11/2008 | Chen et al. | 361/816 |
| D583,771 S | 12/2008 | Lubanski | D13/155 |
| 7,487,791 B1 | 2/2009 | Bradley | 137/355.16 |
| 7,535,720 B2 | 5/2009 | Karasawa et al. | 361/752 |
| 7,567,241 B2 | 7/2009 | King et al. | 345/179 |
| 7,623,360 B2 * | 11/2009 | English et al. | 361/816 |
| 7,640,699 B2 * | 1/2010 | Gilleran | 52/220.1 |
| 2002/0111072 A1 * | 8/2002 | Mikami et al. | 439/620 |
| 2003/0223211 A1 * | 12/2003 | Huang | 361/816 |
| 2005/0054395 A1 | 3/2005 | Arbisi et al. | 455/575.3 |
| 2005/0121523 A1 | 6/2005 | Schmidt et al. | 235/462.46 |
| 2005/0162824 A1 | 7/2005 | Thompson | 361/686 |
| 2006/0012969 A1 | 1/2006 | Bachman | |
| 2006/0141344 A1 | 6/2006 | Chen et al. | |
| 2006/0155074 A1 | 7/2006 | Kudo et al. | 525/329.7 |
| 2006/0172183 A1 | 8/2006 | Chen et al. | |
| 2007/0031727 A1 | 2/2007 | Hsu | |
| 2007/0111086 A1 | 5/2007 | Li et al. | |
| 2007/0117598 A1 | 5/2007 | Yang et al. | |
| 2007/0149021 A1 | 6/2007 | Mikami et al. | 439/165 |
| 2007/0151751 A1 | 7/2007 | Robbins et al. | |
| 2008/0013268 A1 | 1/2008 | Wong et al. | |
| 2008/0096620 A1 | 4/2008 | Lee et al. | 455/575.8 |
| 2008/0112120 A1 | 5/2008 | Huang | 361/683 |
| 2008/0310139 A1 | 12/2008 | English et al. | 361/818 |
| 2010/0134072 A1 * | 6/2010 | Neu et al. | 320/137 |

\* cited by examiner

BATTERY CONNECTOR STRUCTURES FOR ELECTRONIC DEVICES

This application claims the benefit of provisional patent application No. 61/105,030, filed Oct. 13, 2008, which is hereby incorporated by reference herein in its entirety.

BACKGROUND

This invention relates to electronic devices and, more particularly, to battery connector structures for electronic devices such as portable computers.

Electronic devices such as portable computers are powered by batteries. Some electronic devices use permanently attached batteries. This type of arrangement is satisfactory for devices where the additional cost, size, and complexity associated with a removable battery is not warranted. In other electronic devices, however, removable batteries are used.

In devices such as portable computers with removable batteries, a satisfactory battery connector arrangement is required. Battery connector arrangements allow spare batteries to be used when a battery becomes depleted.

It would therefore be desirable to be able to provide improved battery connector structures for electronic devices such as portable computers.

SUMMARY

Improved battery connector structures for electronic devices such as portable computers are provided. A portable computer may be powered by a battery. The battery may have electrical contacts. The electrical contacts may be used for positive and ground power supply voltages and for monitoring signals. A battery connector on the battery may be used to form an electrical connection with a mating battery connector in the portable computer. The battery connector in the portable computer may be attached to the end of a cable. The other end of the cable may be connected to a logic board.

To accommodate battery size variations and various methods of insertion, the portable computer battery connector may be connected to the portable computer using a floating battery connector mounting structure. This floating arrangement may allow the battery connector in the portable computer to move slightly when inserting the battery into the portable computer.

Further features of the invention, its nature and various advantages will be more apparent from the accompanying drawings and the following detailed description of the preferred embodiments.

DETAILED DESCRIPTION

The present invention relates to battery connector structures. The battery connector structures may be used to interconnect batteries with electronic components in an electronic device that require power. For example, a battery connector may be used to interconnect a rechargeable battery with circuitry on a main logic board in an electronic device. The circuitry on the main logic board may distribute battery power to electrical components within the electronic device such a disk drives, processors, memory, input-output circuitry, displays, etc.

The electronic device in which the battery connector structures are provided may be a handheld computer, a miniature or wearable device, a portable computer, a desktop computer, a mobile telephone, a music player, a remote control, a global positioning system device, devices that combine the functions of one or more of these devices and other suitable devices, or any other electronic device. With one suitable arrangement, which is sometimes described herein as an example, the electronic devices in which the battery connector structures are provided may be portable computers such as laptop (notebook) computers. This is, however, merely illustrative. Battery connector structures may, in general, be provided in any suitable electronic device.

Figure 1:
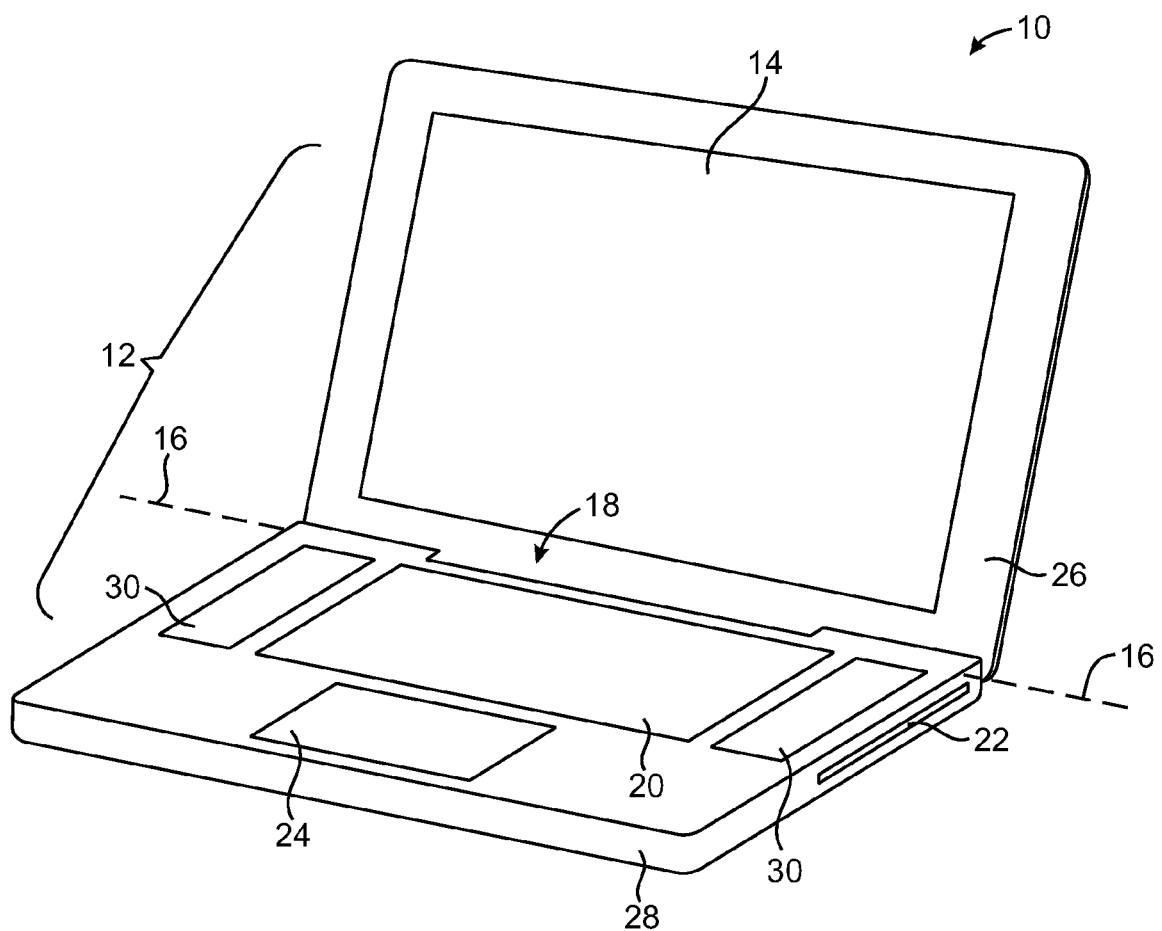
FIG. 1 is a perspective view of an illustrative portable computer in accordance with an embodiment of the present invention.

An illustrative electronic device such as a portable computer in which the battery connector structures may be provided is shown in FIG. 1. As shown in FIG. 1, portable computer 10 may have a housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, etc. An advantage of forming housing 12 at least partly from metal is that metal is durable and attractive in appearance. Metals such as aluminum may be anodized to form an insulating oxide coating.

Case 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover or lid, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12.

If desired, upper and lower housing portions 26 and 28 may have transparent windows through which light may be emitted (e.g., from light-emitting diodes). This type of arrangement may be used, for example, to display status information to a user. Openings may also be formed in the surface of upper and lower housing portions to allow sound to pass through the walls of housing 12. For example, openings may be formed for microphone and speaker ports. With one illustrative arrangement, speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). A glass panel may be mounted in front of display 14. The glass panel may help add structural integrity to computer 10. For example, the glass panel may make upper housing portion 26 more rigid and may protect display 14 from damage due to contact with keys or other structures.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

When unplugged from alternating current (AC) power sources, computer 10 may be powered by a battery. To allow a battery that has become depleted to be replaced with a fresh battery, computer 10 may be provided with a battery connector that mates with a corresponding connector on each battery. When desired, a battery may be inserted into device 10 by forming an electrical connection between the battery connector on the battery and the battery connector in computer 10.

The battery connectors may have electrical contacts. These contacts may be used to convey power. For example, a connector may have one contact that serves as a positive power supply voltage terminal and another contact that serves as a ground power supply voltage terminal. If desired, additional contacts may be included in the connector. For example, additional contacts may be provided that serve as battery cell monitoring tap points. The voltages on these battery cell tap points may be monitored by control circuitry in computer 10.

The battery connector in computer 10 may be connected to circuitry in computer 10 using a cable or other suitable electrical path. The cable may have a connector on one end that allows the cable to be connected to a printed circuit board such as a main logic board. The other end of the cable may be provided with a battery connector for receiving the corresponding battery connector on the battery.

Figure 2:
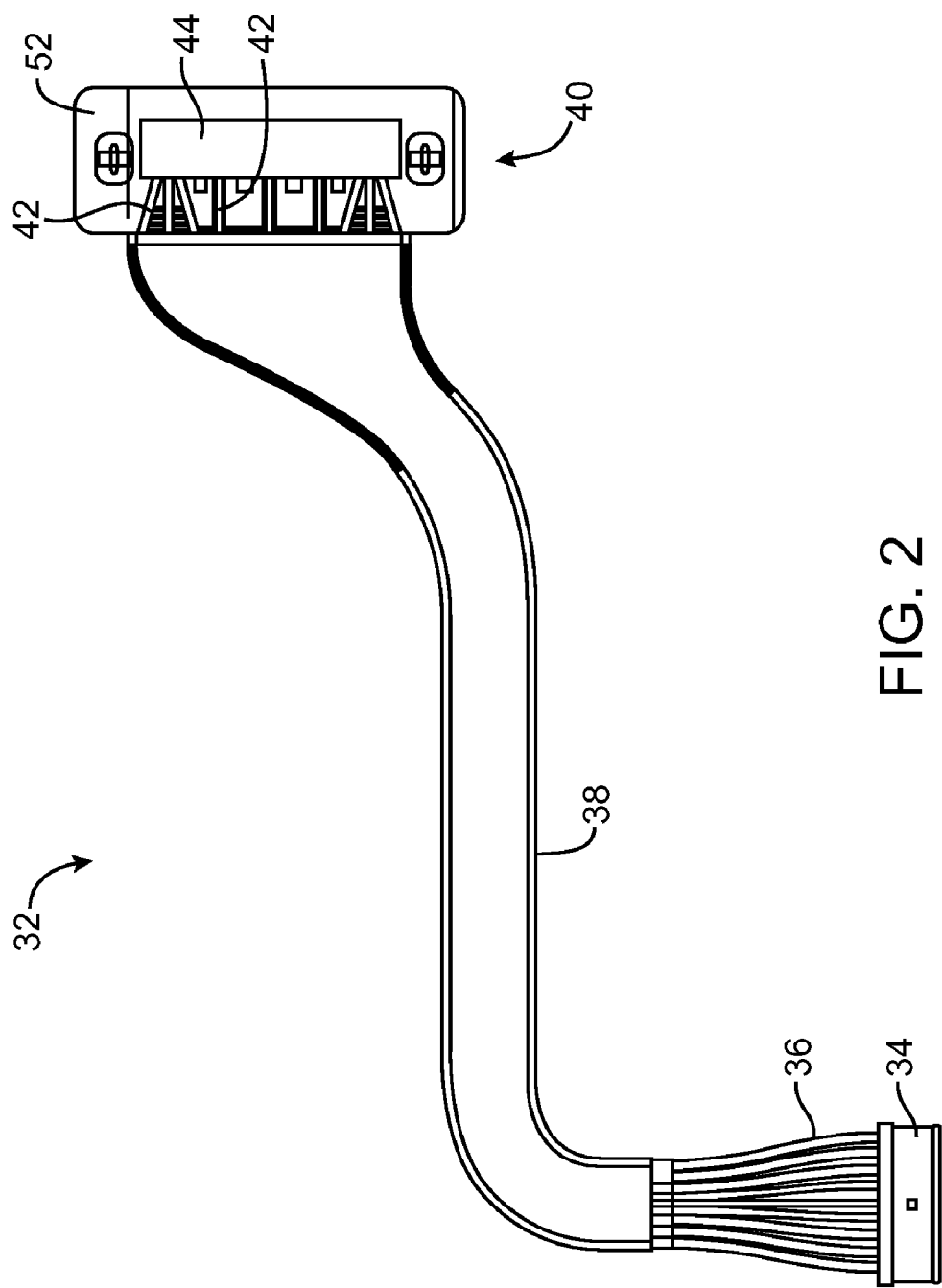
FIG. 2 is a top view of an illustrative battery connector that may be used in a portable computer in accordance with an embodiment of the present invention.

An illustrative cable of this type is shown in FIG. 2. As shown in FIG. 2, battery cable 32 may have a first connector such as connector 34 that plugs into a mating connector on a printed circuit board. Wires 36 or other suitable electrical paths in cable 32 may be used to electrically connect connector 34 to a second connector such as battery connector 40. Connector 40 may have contacts that are configured to mate with corresponding contacts on a battery.

Connector 40 may have a support member such as member 52 that includes channels 42. Wires 36 may be routed through channels 42 and soldered to corresponding electrical contacts. Low current contacts may be connected to single corresponding wires 36. Higher current contacts such as the positive and ground terminals in connector 40 may be associated with multiple wires. For example, the three uppermost channels 42 in FIG. 2 may be used to route three corresponding wires 36 to a positive power supply voltage terminal and the three lowermost channels 42 may be used to route three other wires 36 to a ground power supply voltage terminal. Channels 42 that lie between the channels that are associated with the positive and ground power terminals may be used for routing wires 36 to lower current battery monitoring tap point electrodes.

Wires 36 in cable 32 may be wrapped with a wrap material 38. Wrap 38 may be a fabric (e.g., a synthetic fabric) or any other suitable material.

Cable 32 may be mounted within lower housing portion 28 of computer 10. Lower housing portion 28 may be formed from aluminum or other suitable materials. In the illustration of FIG. 2, cable 32 is shown from its underside (i.e., i.e., looking outwardly from within housing portion 28 in computer 10 to view the bottom portion of cable 32 that normally rests against housing 28). To prevent undesirable shorting contact between the metal of wires 36 and metal in housing portion 28, an insulating layer such as insulator 44 may be mounted to the underside of member 52 and connector 40. Insulating layer 44 may serve as a spacer that raises connector 40 off of the surface of housing portion 28 and thereby helps to prevent shorting. Insulating layer 44 may be formed from plastic or any other suitable dielectric.

Figure 3:
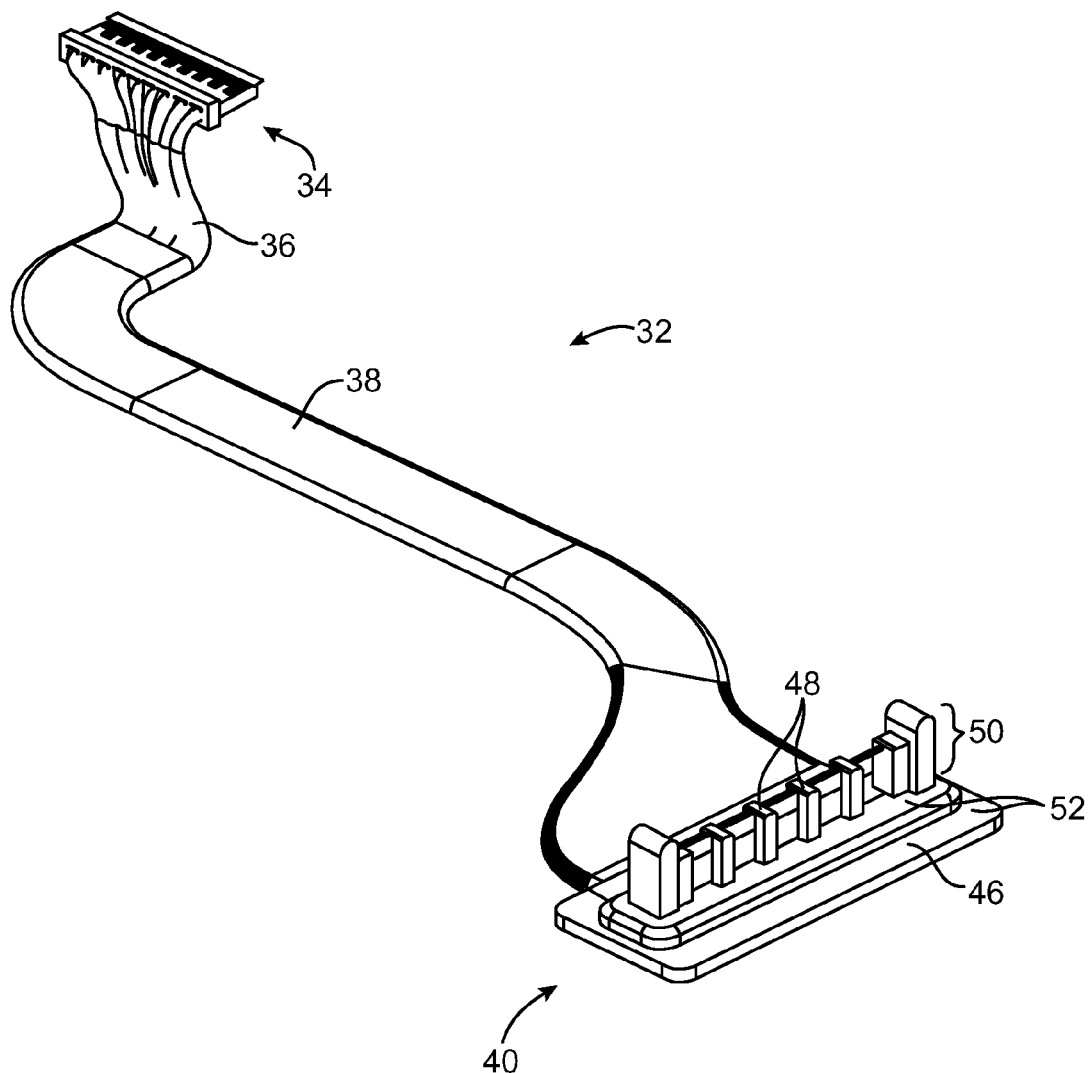
FIG. 3 is a perspective view of an illustrative battery connector that may be used in a portable computer in accordance with an embodiment of the present invention.

A perspective view of cable 32 is shown in FIG. 3. As shown in FIG. 3, wires 36 may be soldered to electrical contacts such as contacts 48. There may be any suitable number of contacts 48 in connector 40. As an example, there may be five contacts 48. Contacts 48 may be mounted within protruding portion 50 of support member 52. Planar base structures 46 may be used to support protruding portion 50. Structures 50 and 52 may be formed from plastic or other suitable materials. In the vicinity of connector 34, wires 36 may have a bend. This bend may allow wires 36 to be routed under housing structures such as a midwall member in housing portion 28.

Figure 4:
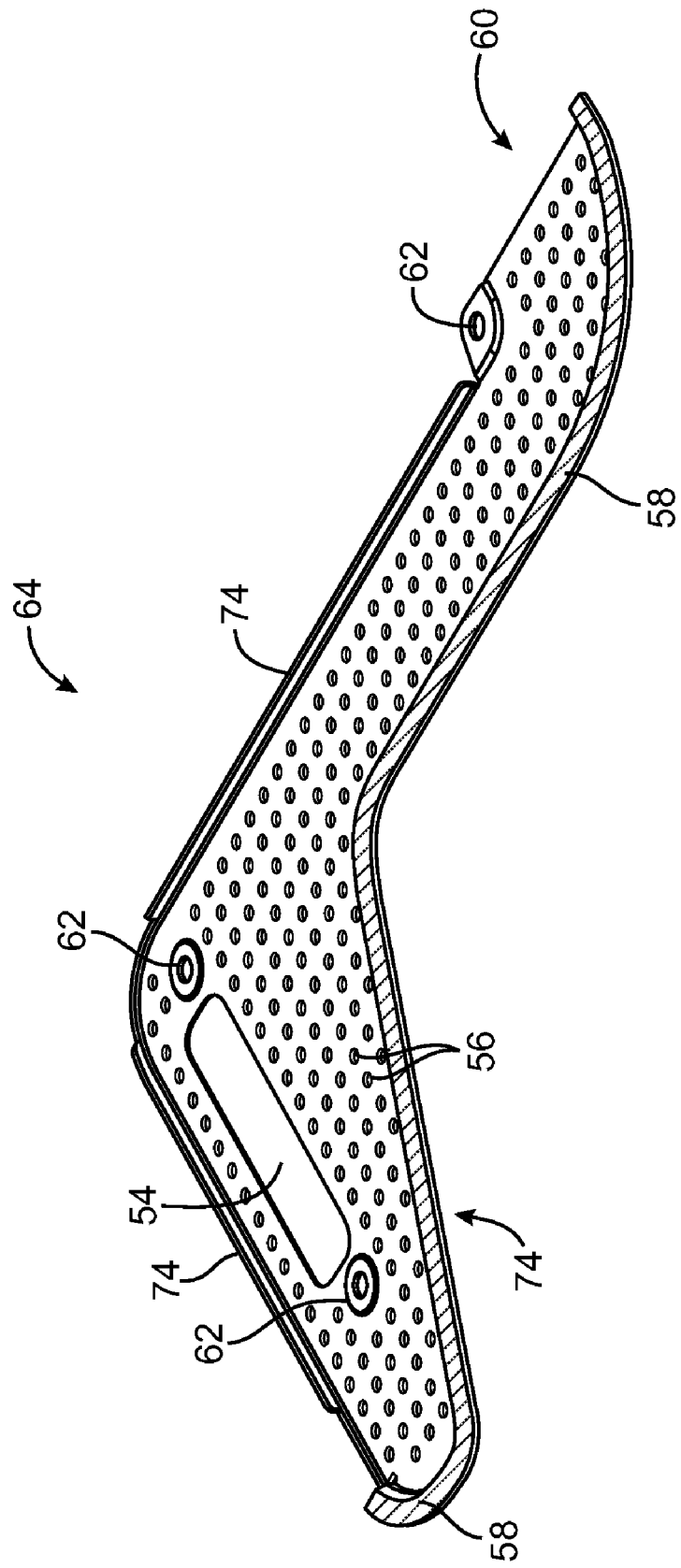
FIG. 4 is a perspective view of an illustrative cover member that may be used in securing a battery connector in a portable computer in accordance with an embodiment of the present invention.

To secure cable 32 within housing portion 28 while allowing connector 40 to float and thereby accommodate various possible battery positions, cable 32 may be held in place using a cover member. An illustrative cover member is shown in FIG. 4. In the example of FIG. 4, cover member 64 is shown in an inverted orientation. The upper surface of cover member 64 in FIG. 4 is normally placed directly against wrap 38 of cable 32 (FIG. 3).

As shown in FIG. 4, cover member 64 may have an opening 54 through which protruding portion 50 of connector 40 may pass when cover 64 is used to mount cable 32 to housing portion 28. Opening 54 may be rectangular in shape or may have any other suitable shape that accommodates connector 40.

Holes 62 in cover 64 may be used to receive screws. The screws may be screwed into mating threaded portions of lower housing portion 28 when it is desired to fasten cover 64 to housing portion 28. This is merely illustrative. If desired, other attachment mechanisms may be used. For example, a strip of adhesive such as adhesive strip 58 may be used to attach cover 64 to housing portion 28. Cover 64 may be provided with holes 56. Holes 56 (i.e., perforations) may be provided over substantially all of cover 64. Perforations 56 may provide an attractive appearance for cover 64 and may save weight. Cover 64 may be formed from sheet metal such as a 0.5 mm thick sheet of aluminum or other suitable materials. Holes 56 may be formed in cover 64 by punching, mechanical drilling, laser drilling, etc. After holes 56 have been formed, cover 64 may be provided with a desired three-dimensional shape using a stamping process. For example, cover 64 may be provided with protruding edges 74. Edges 74 help to hold the main surface of cover 64 off of the planar surface of lower housing portion 28, thereby allowing wrap 38 and the rest of cable 32 to float relative to housing portion 28. Opening 60 in edges 74 may be used to allow cable 32 to exit from under cover 64.

Figure 5:
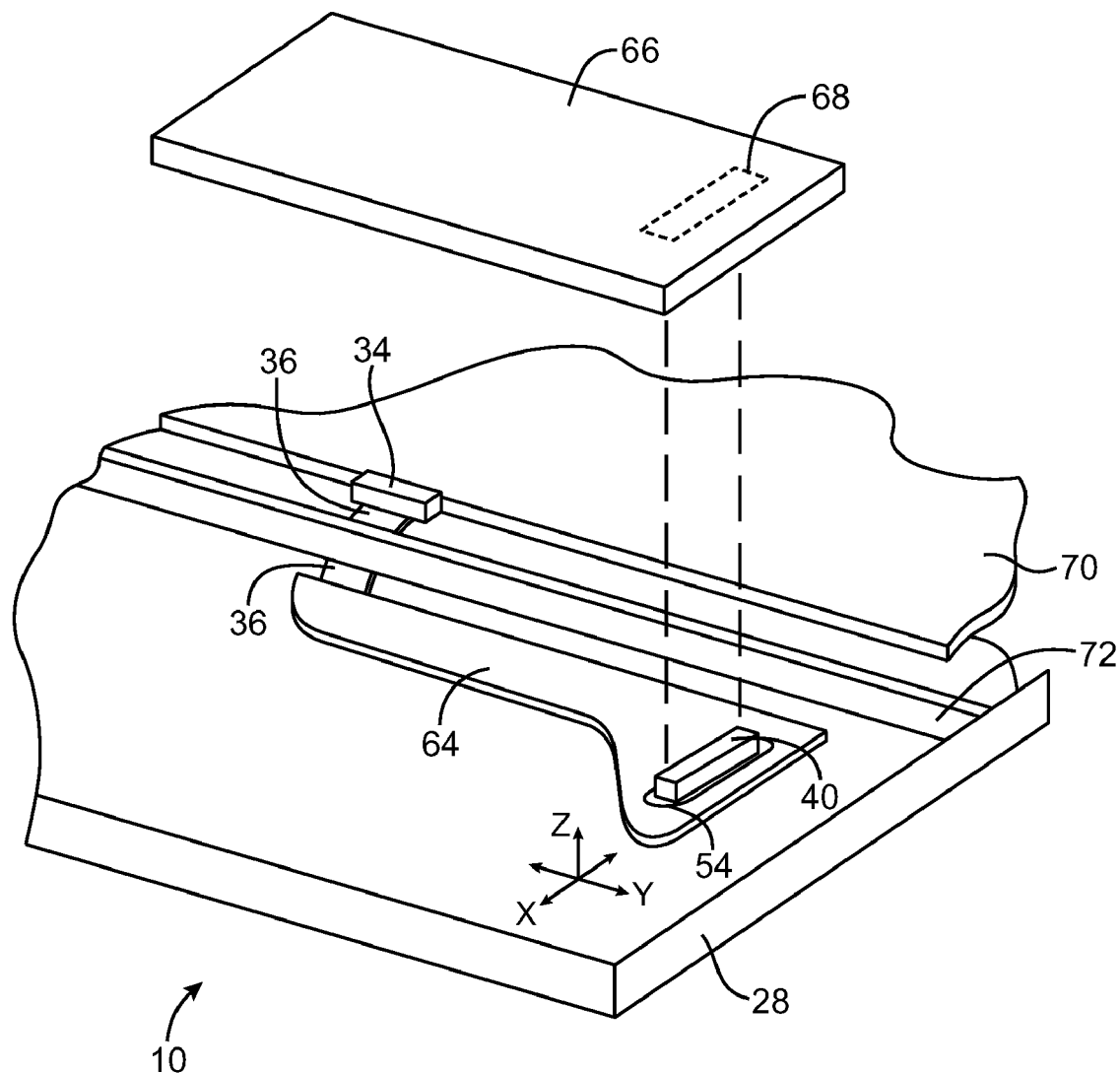
FIG. 5 is an exploded perspective view of an illustrative battery connector in a portable computer in accordance with an embodiment of the present invention.

FIG. 5 is an exploded perspective view of an interior portion of computer 10 showing how connector 40 may be mounted to lower housing portion 28 using cover 64. Battery 66 may have a connector 68 that mates with connector 40. Opening 54 in cover 64 may be large enough to allow connector 40 to translate somewhat in lateral dimensions X and Y (i.e., in the plane of the inner surface of housing 28). This allows connector 40 to move to accommodate variations in the position of connector 68. In the vertical ("Z") dimension (i.e., perpendicular to the plane of the housing surface), the planar portions of cover 64 are preferably raised sufficiently off of housing portion 28 so that wrap 38 and the other portions of cable 32 are not held firmly in place. This clearance in the vertical dimension between cover 64 and cable 32 helps reduce friction in the X and Y dimensions and thereby ensures a satisfactory float in the position of connector 40. At the same time, there is preferably not too much clearance in dimension Z, so that connector 40 is maintained at its desired position on housing portion 28.

As shown in FIG. 5, computer 10 may have housing structures such as midwall member 72. Wires 36 of cable 32 (FIG. 3) may be routed under midwall 72 and connected to printed circuit board 70 using connector 34.

The foregoing is merely illustrative of the principles of this invention and various modifications can be made by those skilled in the art without departing from the scope and spirit of the invention.

What is claimed is:

1. A battery connector structure for an electronic device having a housing, comprising:
   a cable;
   a battery connector attached to the cable; and
   a cover mounted to the housing that covers the cable while allowing the cable to float with respect to the housing along a length of the cable that is between the cover and the housing to accommodate variations in battery connector position.

2. The battery connector structure defined in claim 1 wherein the cover comprises a sheet of material having a plurality of perforations.

3. The battery connector structure defined in claim 1 wherein the cover comprises a metal sheet and wherein there are perforations over substantially all of the metal sheet.

4. The battery connector structure defined in claim 1 wherein the cover comprises a sheet of material having an opening and wherein the battery connector protrudes through the opening when the cover is mounted to the housing.

5. The battery connector structure defined in claim 4 wherein the battery connector has lateral dimensions and wherein the opening is configured to have lateral dimensions that are larger than the lateral dimensions of the battery connector so that the battery connector translates laterally to accommodate variations in battery connector position.

6. The battery connector structure defined in claim 5 wherein the cover is mounted to the housing on a planar surface of the housing, wherein the cable has a vertical dimension perpendicular to the planar surface, and wherein the cover has a vertical dimension that is greater than the cable vertical dimension so that the battery connector and the cable translate laterally to accommodate variations in battery connector position.

7. A portable computer, comprising:
   a housing;
   a printed circuit board having circuitry;
   a cable connected on one end to the printed circuit board;
   a battery connector on another end of the cable; and
   a cover with which the cable and battery connector are mounted to a planar inner surface of the housing, wherein the cover is configured to provide clearance that allows the cable to move relative to the cover and the housing when the cover is mounted to the planar inner surface.

8. The portable computer defined in claim 7 wherein the cover comprises a metal sheet that covers substantially all of the cable.

9. The portable computer defined in claim 7 wherein the cover comprises a sheet of material having edges that are attached to the planar inner surface.

10. The portable computer defined in claim 9 wherein the cover comprises a metal sheet having an array of at least ten holes.

11. The portable computer defined in claim 7 further comprising a midwall member under which the cable is routed.

12. The portable computer defined in claim 7 wherein portions of the cover are configured to define an opening through which the battery connector protrudes and connects to a battery.

13. The portable computer defined in claim 12 wherein the opening is substantially rectangular and wherein the portions of the cover are further configured to define screw holes at either end of the rectangular opening.

14. An electronic device, comprising:
   a housing;
   circuitry on a printed circuit board mounted within the housing;
   wires connected to the circuitry;
   a battery connector that is attached to the wires;
   a battery with a connector that mates with the battery connector attached to the wires; and
   a planar cover that is attached to the housing and that holds the wires to a planar inner surface of the housing, wherein the planar cover has an opening through which the battery connector protrudes and wherein the planar cover is configured to provide clearance that allows the wires and the battery connector that is attached to the wires to move when the connector of the battery mates with the battery connector attached to the wires.

15. The electronic device defined in claim 14 wherein the planar cover comprises a sheet of material and a strip of adhesive interposed between the sheet of material and the planar inner surface.

16. The electronic device defined in claim 14 wherein the opening comprises a first opening, wherein the planar cover has a portion that defines a second opening wherein the second opening is between the planar cover and the housing when the planar cover is attached to the and housing, wherein the wires pass through the second opening between the planar cover and the housing.

17. The electronic device defined in claim 16 wherein the planar cover comprises a sheet of material and a strip of adhesive interposed between the sheet of material and the planar inner surface and wherein the first opening comprises a rectangular opening through which the battery connector protrudes to mate with the battery.

* * * * *